Figure 1:
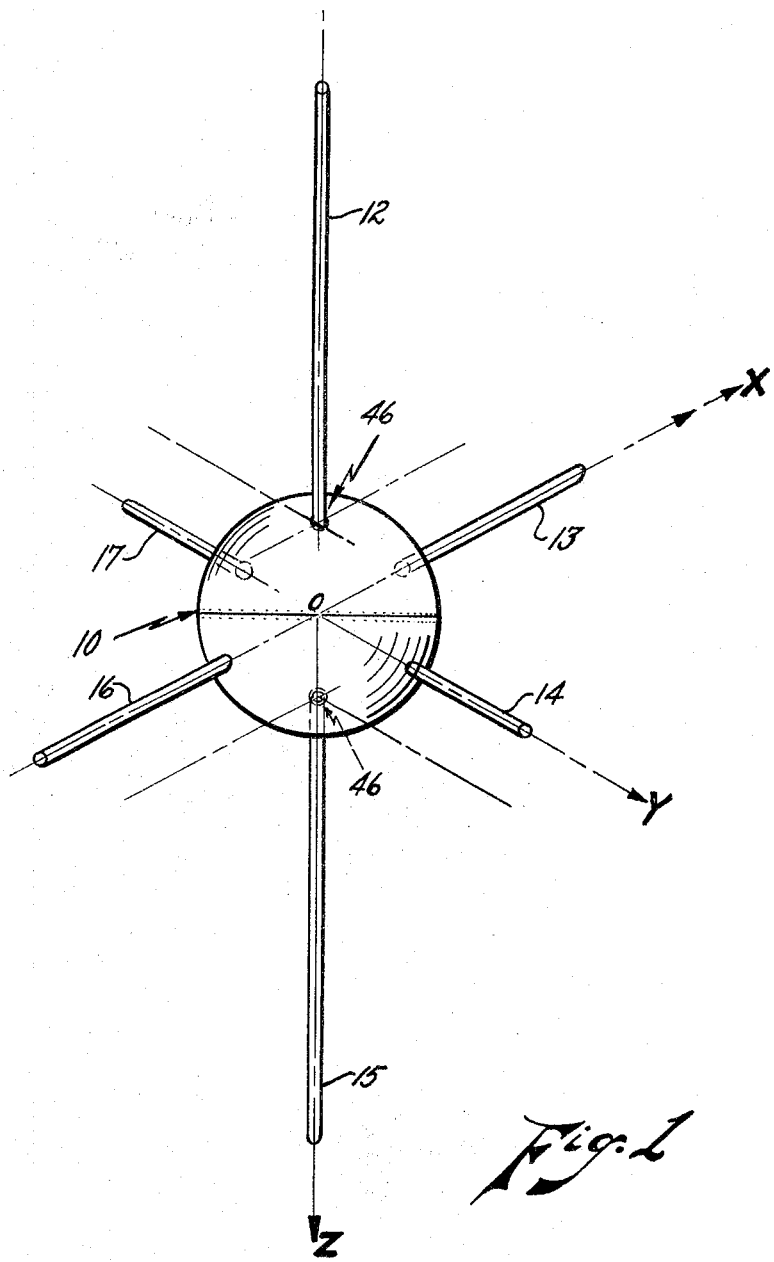

Aug. 23, 1966   B. ETKIN   3,268,183
PASSIVE STABILIZATION OF AN EARTH'S SATELLITE
Filed Dec. 12, 1963   2 Sheets-Sheet 1

INVENTOR.
BERNARD ETKIN
BY
ATTORNEYS

Aug. 23, 1966 B. ETKIN 3,268,183
PASSIVE STABILIZATION OF AN EARTH'S SATELLITE
Filed Dec. 12, 1963 2 Sheets-Sheet 2
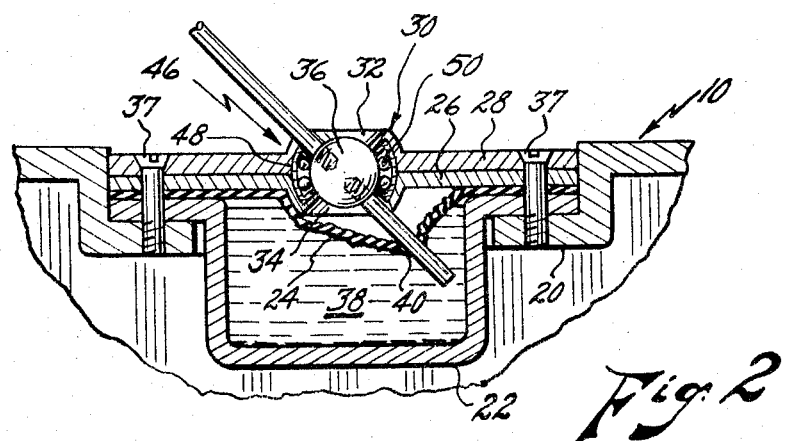
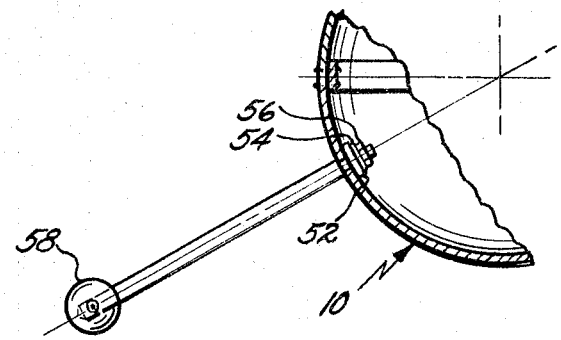
INVENTOR.
BERNARD ETKIN
BY Wade Koontz
Sherman H. Goldman
ATTORNEYS

# United States Patent Office 3,268,183
Patented August 23, 1966

3,268,183
PASSIVE STABILIZATION OF AN EARTH'S SATELLITE
Bernard Etkin, Toronto, Ontario, Canada, assignor to the United States of America as represented by the Secretary of the Air Force
Filed Dec. 12, 1963, Ser. No. 330,213
11 Claims. (Cl. 244—1)

This invention relates generally to earth satellite design and more particularly to a system for passively stabilizing the attitude of an orbiting satellite vehicle.

Satellite vehicles which have been projected into outer space have previously had complex passive systems or had to have measurements and calculations performed once the vehicle had reached its orbiting height. Then, radio signals were utilized to trigger attitude jets or operate magnetic fields or inertia wheels on the satellite to place it into the proper orbit. After the orbit had been established, further measurements and calculations were made to maintain proper orientation of the vehicle. At various spans of time during the orbiting, corrections had to be calculated in order to trigger various means to correct the attitude of the satellite. Alternatively, complex infrared or gyro-type sensors on the satellite have been used where ground control was eliminated.

This invention provides a means for passively stabilizing an earth satellite by the use of the gravity-gradient principle. The system is gravity-oriented in that one principal axis is maintained approximately vertical. The invention is applied to compound satellite systems which are comprised of more than one body coupled by elastic and/or frictional elements. Stabilization of attitude is necessary in order to provide a platform in the upper atmosphere which allows for accurate scientific measurements.

The invention comprises the utilization of a number of stabilizer rods mounted on a satellite body such that the vertically oriented rods are universely hinged at their roots or at some point along their length in order to provide stabilization of pitch and roll. Horizontal rods are fixed to the satellite in order to provide stabilization in roll/yaw and yaw. In addition, the device utilizes one of the conventional forms of damping such as electromagnetic damping or viscous fluid damping, solid damping or sliding friction damping.

Accordingly, it is a primary object of this invention to provide a method and means for passively stabilizing an earth satellite.

It is another object of this invention to provide for a gravity-oriented compound satellite system wherein attitude stabilizing elements for pitch/roll are coupled to the satellite body by elastic and/or frictional elements.

It is still another object of this invention to provide a passive attitude stabilization system, the elements of which are capable of utilization as radio antennae.

It is a further object of this invention to provide a passive stabilization system for a satellite body which corrects for solar radiation pressure, orbit ellipticity, internla mass motions, atmospheric drag, particle impacts, etc., wherein the system oscillates in characteristic, normal modes which involve relative motion of stabilizer rods as well as rotation and translation of the satellite body.

It is a still further object of this invention to provide a passive stabilization system with both fixed and movable stabilizer elements wherein the movable elements are caused to have a relative motion with respect to the satellite body to bring about viscous or frictional forces which damp oscillations.

Another object of this invention involves the provision of a passive attitude stabilization system for a satellite vehicle which is simpler and more accurate than present passive systems and is easily manufactured of conventional, currently available materials which lend themselves to mass production manufacturing techniques.

These and other advantages, features and objects of the invention will become more apparent from the following description taken in connection with the illustrative embodiment in the accompanying drawings, wherein:

FIGURE 1 comprises a schematic representation of a satellite with the stabilizers attached thereto;

FIGURE 2 is a schematic representation, partially in cross-section, of one embodiment of a pitch/roll stabilizer system; and FIGURE 3 is a schematic representation, partly in cross-section of a means for securing the yaw and roll/yaw stabilizer elements.

Referring to FIGURE 1, there is shown schematically a geometrically symmetrical satellite 10 which has applied thereto stabilizer rods 12, 13, 14, 15, 16 and 17, which may also be utilized as antennae. The satellite body may be of any shape whatever, although the analysis and design are simplest if it has three axes of symmetry. Rods 12 and 15 are secured to or coupled with the satellite by means of elastic and/or frictional elements. This combination renders the vehicle a compound one which is arranged to orbit with one principal axis in a substantially vertical direction. Either one or a pair of rods may be provided on the vertical axis.

The generally vertical rods 12 and 15 are applied to the top and bottom of satellite 10 at 46 along the Z axis of the satellite. These stabilizer rods are used to provide stabilization in pitch and roll. The rods 13 and 16 are mounted generally on the horizontal X axis of the satellite 10 in the orbital plane in order to provide stabilization in yaw while rods 14, 17 on the Y axis, perpendicular to the orbital plane, provide roll/yaw coupling.

The theoretical framework for analyzing the rotational and relative motion of a compound satellite system is presented in UTIA Report No. 89 of the Institute of Aerophysics, University of Toronto, titled "Attitude Stability of Articulated Gravity-Oriented Satellites," Part I—General Theory, and Motion in Orbital Plane, by Bernard Etkin. The report derives the expressions for the forces and moments acting on the constituent bodies of a compound satellite system and utilizes them in Lagrange's equation governing the motion of the system. The method is applied to the systems as described in this invention for passive attitude stabilization.

A special hinging arrangement is required to be provided for the pitch/roll stabilizing rods, and damping devices are incorporated in the hinges such that the motion of the rods relative to satellite body 10 is resisted by viscous, electromagnetic or other frictional means for damping the oscillations.

The details of the pitch/roll stabilizer system 46 and its attachment to the satellite with viscous damping may be described relative to the schematic representation shown partly in section in FIGURE 2. The satellite 10 has a flange 20 formed as a part thereof on which is mounted a container or tank 22, a flexible diaphragm 24 and a pair of plates 26, 28 forming a bearing for universal movement at 30. Plates 26 and 28 have spherical portions which are cut at 32 and 34, respectively, such that a pitch/roll rod 12 or 15, which is mounted to ball 36, extends from without the satellite into the interior of the tank 22. A series of machine screws 37, or some other conventional securing means, is provided to hold the assembly in position. The pitch/roll rod extends through the ball 36 into the tank 22 which contains a viscous fluid 38. A diaphragm seal is provided at 40 to a portion of the rod extending into the tank, thereby inhibiting the flow of fluid from the tank. Thus, the stabilizer rods are free to move within the limits defined by the cutout portions 32 and 34.

The ball and socket connection at 30 for the pitch/roll rods 12 and 15 utilize a series of ball bearings 50 and a race 48 set into the socket in order to minimize friction in the bearing. The dry type friction normally present in a ball and socket joint should be absent or minimal. The embodiment of FIGURE 2 is intended to be schematic in nature and serves only to represent a universal type hinge with a damping means. The support for the rod could comprise a diamagnetic bearing with the damping force supplied by electromagnetic damping. This arrangement will allow for the selection of separate, appropriate damping values for the pitch/roll directions. An electromagnetic damper, which comprises a coil within a magnetic field, would generate a current in a resistive circuit when movement of the stabilizer rod relative to the satellite body causes the coil to rotate. The diamagnetic bearing could be utilized to produce the magnetic field required for damping.

The yaw stabilizer system is secured to the shell of the satellite body 10 in any conventional manner, one of which is depicted in FIGURE 3. A hole is provided in the body 10 through which extends a reduced portion of the stabilizer rod. The end portion of the rod within the body is threaded such that when a washer 54 and nut 56 are applied, the shoulder adjacent the reduced portion of the rod is clamped against the satellite body. Also illustrated in FIGURE 3 is an additional mass 58 applied to a rod. Any of the fixed or hinged rods may have an additional mass at its tip. Depending upon the distribution of mass in the satellite body on the performance requirements of the mission, the yaw stabilizer and/or the roll/yaw couplers may be omitted.

The stable equilibrium attitude of the system can be made to correspond where all the stabilizer rods correspond to the appropriate X, Y and Z axes by arranging the mass distribution according to the well known principles of gravity-gradient stabilization. When the satellite 10 is disturbed from this configuration by solar radiation pressure, orbit eccentricity, internal mass motion, atmosphere drag, particle impact, etc., the system oscillates in characteristic normal modes which involve relative motion of the vertical stabilizer rods as well as rotation and translation of the satellite body and the fixed stabilizer rods. This relative motion brings the damping devices into play, thereby causing a damping of the oscillation in accordance with the principles referred to in the aforementioned publication.

Thus, there has been presented a design which is capable of providing damping to one-half amplitude in as little as one-third of an orbit with a small response to orbit eccentricity.

Although the invention has been described relative to a particular embodiment, it should be understood to those skilled in the art that the invention is capable of a variety of alternative embodiments, for example, each of the stabilizer rods may have additional mass applied to the tips thereof, and the pitch/roll stabilizer may comprise either one or two rods. In addition, where viscous damping is utilized, the rods in the viscous fluid may be made in the form of plates or cylinders having holes therein in order to provide the proper damping force.

I intend to be limited only by the spirit and scope of the appended claims.

I claim:
1. A passive stabilization system for a gravity-gradient satellite comprising a geometrically symmetrical satellite body, and a rod extending from said body at the intersection of the vertical axis of said body with the outer periphery thereof, the connection of said rod to said body allowing for universal motion of said rod with respect to said body.
2. A device as defined in claim 1 including a fixed horizontal rod emanating from said satellite on the horizontal axis thereof in the orbital plane.
3. A device as defined in claim 1 including a fixed rod emanating from said satellite on a horizontal axis perpendicular to the orbital plane.
4. A system as defined in claim 1 including means within said body for damping motion of said rod.
5. A device as defined in claim 4 wherein said means for damping utilizes a viscous fluid for the damping medium.
6. A passive stabilization system for a gravity-gradient satellite comprising a geometrically symmetrical satellite body, and a pair of rods extending from said body at the intersection of the vertical axis of said body with the outer periphery thereof, the connection of said rods to said body allowing for universal motion of said rods with respect to said body.
7. A device as defined in claim 6 including a pair of fixed horizontal rods emanating from said satellite on the horizontal axis thereof in the orbital plane.
8. A device as defined in claim 6 including a pair of fixed rods emanating from said satellite on a horizontal axis perpendicular to the orbital plane.
9. A system as defined in claim 6 including means within said body for damping motion of said pair of rods at the intersection of said vertical axis with said body.
10. A device as defined in claim 9 wherein said means for damping utilizes a viscous fluid for the damping medium.
11. A passive stabilization system for a gravity-gradient satellite comprising a satellite body having three axes of symmetry, a pair of rods each extending from said body at the intersection thereof with the vertical axis of said body, a pair of fixed rods extending from the outer periphery of said body on a horizontal axis in the orbital plane, a second pair of rods emanating from said body along a horizontal axis perpendicular to said orbital plane, said first-mentioned rods having a universal coupling to said body for movement relative thereto, and means acting on said movable rods for damping oscillations of said rods when relative movement occurs between said rods and said body.

References Cited by the Examiner

UNITED STATES PATENTS

| | | | |
|---|---|---|---|
| 2,835,548 | 5/1958 | Baumann | 244—1 |
| 3,116,484 | 12/1963 | Cutler | 244—1 |
| 3,168,263 | 2/1965 | Kamm | 244—1 |

FERGUS S. MIDDLETON, *Primary Examiner.*